(12) United States Patent
Arora

(10) Patent No.: US 7,630,966 B2
(45) Date of Patent: Dec. 8, 2009

(54) MEDIA CONTENT REVIEWS SEARCH

(75) Inventor: Gagan Arora, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 11/276,847

(22) Filed: Mar. 16, 2006

(65) Prior Publication Data
US 2007/0220056 A1  Sep. 20, 2007

(51) Int. Cl.
*G06F 17/30* (2006.01)

(52) U.S. Cl. .......................................... 707/3; 707/200
(58) Field of Classification Search ........................ None
See application file for complete search history.

(56) References Cited

U.S. PATENT DOCUMENTS

| 2002/0042793 | A1* | 4/2002 | Choi .............................. 707/6 |
| 2002/0100046 | A1* | 7/2002 | Dudkiewicz .................. 725/46 |
| 2003/0130997 | A1* | 7/2003 | Enewoldsen et al. ........... 707/3 |
| 2003/0195863 | A1* | 10/2003 | Marsh ........................... 707/1 |
| 2003/0229638 | A1* | 12/2003 | Carpenter et al. ............. 707/10 |
| 2004/0194141 | A1* | 9/2004 | Sanders ....................... 725/53 |
| 2004/0216156 | A1* | 10/2004 | Wagner ........................ 725/39 |
| 2005/0172318 | A1* | 8/2005 | Dudkiewicz et al. .......... 725/46 |
| 2006/0156326 | A1* | 7/2006 | Goronzy et al. ............... 725/13 |

* cited by examiner

*Primary Examiner*—Pierre M Vital
*Assistant Examiner*—Truong V Vo
(74) *Attorney, Agent, or Firm*—Lee & Hayes, PLLC

(57) ABSTRACT

Media content reviews search is described. In an embodiment, an indexing service identifies keywords in a program review of a program where the program review includes one or more depictions of the program. The indexing service also identifies content identifiers in the program review of the program, and generates a program index to position the program into an index of programs that includes similar programs based on depictions of the programs.

14 Claims, 7 Drawing Sheets

MEDIA CONTENT REVIEWS SEARCH

BACKGROUND

As the variety of programming and media content sources continues to increase exponentially, a viewer needs to be able to locate media content and programming choices that may be of interest to the viewer. Typical program descriptions, such as displayed in a programming guide when a particular program or movie is selected, merely provide a short plot description, rating information, and/or a list of some cast members. These short, generic plot descriptions are typically obtained from a listing service, or a provider of the content, and the rating information is provided by broadcast and cable television networks and/or by other associations. These simple program descriptions, however, rarely provide enough information for a viewer to decide whether a program or movie will be of interest to the viewer.

SUMMARY

This summary is provided to introduce simplified concepts of media content reviews search which is further described below in the Detailed Description. This summary is not intended to identify essential features of the claimed subject matter, nor is it intended for use in determining the scope of the claimed subject matter.

In an embodiment of media content reviews search, an indexing service identifies keywords in a program review of a program where the program review includes one or more depictions of the program. The indexing service also identifies content identifiers in the program review of the program, and generates a program index to position the program into an index of programs that includes similar programs based on depictions of the programs. A depiction of a program can be any one or combination of an impression, a theme, or a feature of the program, and the programs can be determined to be similar based on the depictions of the programs. The keywords and/or key phrases in the program review represent depiction(s) of the program, and the content identifiers are descriptive terms about the program in the program review. The indexing service generates the program index of the program based on any one or combination of the keywords, key phrases, and content identifiers in the program review of the program.

In other embodiments of media content reviews search, a recommendation service receives a search request for additional programs that are similar to a program, such as from a television-based client device. The indexing service identifies similar programs in the index of programs based on depictions of the programs. The recommendation service then communicates or provides a list of similar programs to the television-based client device as viewing recommendations.

BRIEF DESCRIPTION OF THE DRAWINGS

The same numbers are used throughout the drawings to reference like features and components.

DETAILED DESCRIPTION

Media content reviews search is described in which embodiments provide that program reviews are used to determine programming and viewing recommendations, rather than viewers having to rely on typical short, generic plot descriptions. Depictions of programs can be identified in the program reviews to compare and determine programs that are similar, where program depictions can include an impression, a theme, an idea, a feature, a concept, a highlight, a comparison, and/or a subjective notion of a program. These types of program depictions are written by people that describe a program with subjective relevance such that a program review depicts how a writer thinks about the program.

While aspects of the described systems and methods for media content reviews search can be implemented in any number of different computing systems, environments, television-based entertainment systems, and/or configurations, embodiments of media content reviews search are described in the context of the following exemplary system architecture(s).

Figure 1:
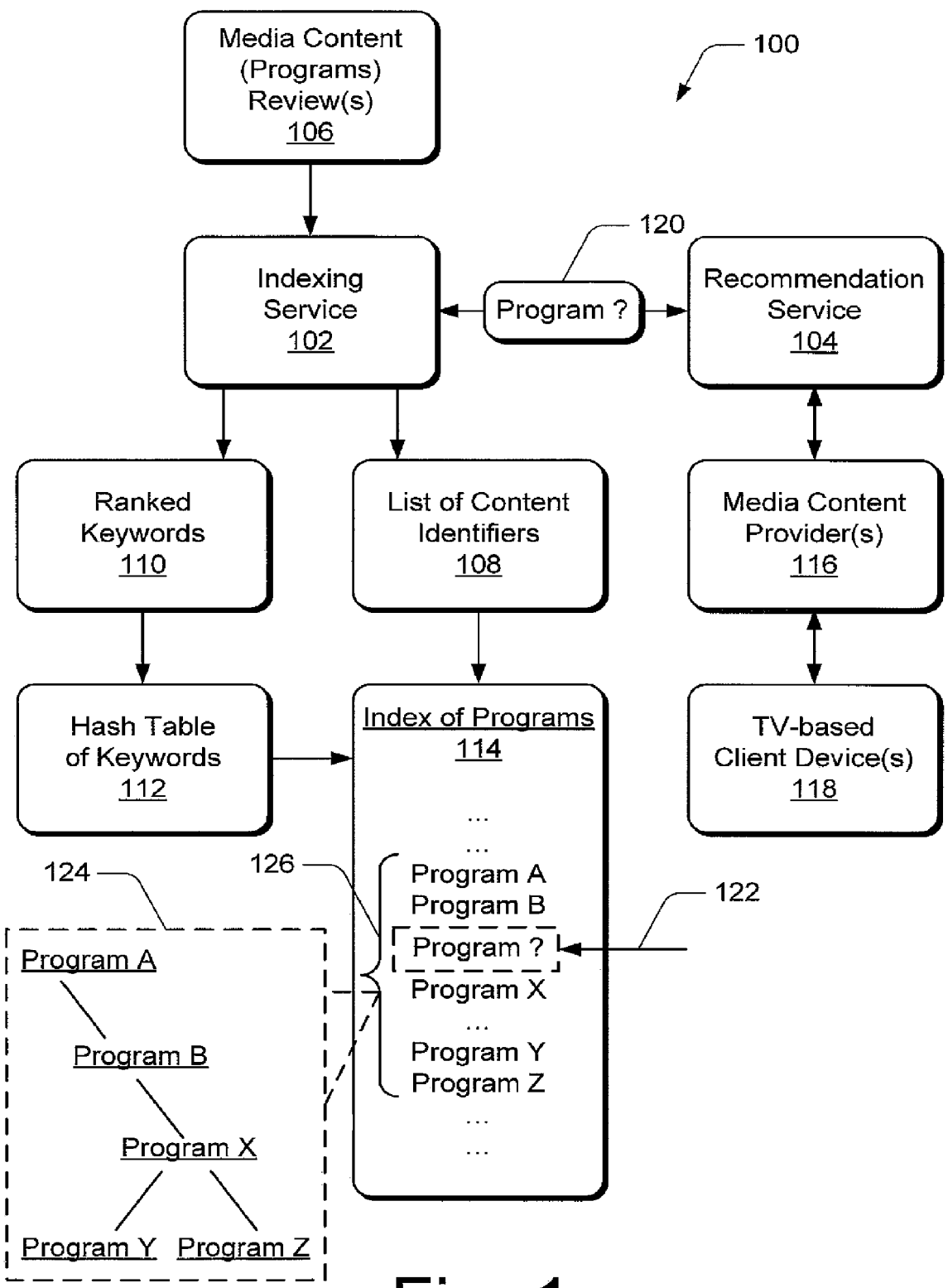
FIG. 1 illustrates an exemplary media content reviews search system in which embodiments of media content reviews search can be implemented.

FIG. 1 illustrates an exemplary media content reviews search system 100 in which embodiments of media content reviews search can be implemented. The system 100 includes an indexing service 102 and a recommendation service 104. In this example, the indexing service 102 receives any number of media content reviews 106 which are also identified as program reviews. As described herein, a "program" refers to any television program, movie, commercial, musical piece, on-demand and/or broadcast media content, and any similar audio, video, and/or image media content. A media content review 106 includes any form of a critic's review or write-up, such as a movie review that contains much more information about a movie than a typical short, generic plot description. Additionally, a program review 106 can include many depictions of a program, such as any one or combination of an impression, a theme, an idea, a feature, a concept, a highlight, a comparison, and/or a subjective notion of the program.

A media content review 106 can also be obtained or provided from any number of different sources, such as from movie reviewers and critics, from Usenet groups that post a collection of media content review notes, from "blogs" (i.e., weblogs) posted by individuals, and/or from any other of the cultures, subcultures (such as a church group), and associations in our many societies. A media content review 106 provides the many program depictions when written by people that describe a program with subjective relevance such that a program review depicts how a writer thinks about the program, rather than just a generic plot description. For example, a movie reviewer or critic may comment on a great music score associated with a movie, character dramas and a romance that develops during wartime circumstances (where the plot may simply describe the movie as a "war movie"), exceptional special effects, and the many other possible subjective depictions of the movie. A media content review 106 provides much more information and "indexable" terms for a comparison basis, and can be utilized to identify similar programs to provide better programming recommendations for viewers.

The indexing service 102 can receive a program review 106 of a program and identify keywords and content identifiers in the program review. In an embodiment, the content identifiers are descriptive terms about the program, such as a director's name, actors' names, and other similar identifiers that are maintained in a list of content identifiers 108.

As referenced herein, the term "keywords" also includes "key phrases" identified in the program review of the program. In an embodiment, the keywords (and key phrases) represent depiction(s) of the program, as described above. Examples of keywords associated with a war movie may include "romance", "war", "1960's", "fighting", "European theatre", "dramatic imagery", and the like. The indexing service 102 generates a list of weighted or ranked keywords 110, such as with a Naïve Bayesian or other algorithm. The indexing service 102 can then also generate a hash table of the keywords 112 which for a comparison basis, is optimized to enable searching for programs that are similar.

The indexing service 102 can also filter the program review of the program to eliminate words that are not the keywords or the content identifiers in the program review, such as by object filtering to take out words that don't have a relevance to a depiction of the program. The indexing service 102 can then generate a program index to position the program into an index of programs 114 such that the program is associated with similar programs. In an embodiment, a database can be implemented to maintain the index of programs 114. The indexing service 102 generates the program index of the program based on the weighted or ranked keywords 110 and based on the content identifiers 108. The index of programs 114 can be developed based on various combinations of techniques such as object filtering, term weighting, and co-occurrence analysis to build use metadata from the media content reviews 106. When a viewer wants to find similar content, the index of programs 114 can be searched to find similar programs.

In this example, the exemplary media content reviews search system 100 also includes media content provider(s) 116 and television-based client device(s) 118. A television-based client device 118 can be implemented with any number and combination of differing components as described with reference to the television-based client device 202 shown in FIG. 2, and with reference to the exemplary client device 600 shown in FIG. 6. A client device 118 receives programs, associated program content, various forms of media content, program guide data, advertising content, and other media content from content server(s) of one or more media content provider 116 via a distribution network.

In an embodiment of media content reviews search, a viewer at a television-based client device can initiate a search request for programming or viewing recommendations that are similar to another program or movie. The recommendation service 104 receives the search request for additional programs from a media content provider 116 and communicates the search request as a program identifier 120, as a program review, or as any other type of search request to the indexing service 102. The indexing service 102 can then determine similar programs from the index of programs 114 and/or generate a program index for the search program to determine where the search request program would be indexed or positioned 122 in the index of programs 114.

The index of programs 114 can be represented as an index graph 124 in which the distance between a program and additional programs is an indication or representation of whether the program and the additional programs are similar. For example, based on a distance or an offset in the index graph 124, programs "B", "Y", and "Z" are most likely similar to program "X", while program "A" is less similar to program "X". Similar programs can be determined by traversing the index graph 124 and returning reviews, programs, movies, etc. that are in ranked order based on the distance offset in the graph 124.

The indexing service 102 can identify similar programs 126 in the index of programs 114 or in the index graph 124 which are returned to the recommendation service 104. A list of the similar programs 126 can then be communicated as viewing recommendations back to the requesting television-based client device via an associated media content provider 116. The recommendation service 104 and/or an associated media content provider 116 can provide programming recommendations to a viewer via an email message, a mobile text message, and/or as a programming guide selection. For example, a viewer may receive an email or text message on a computing-based device such as a mobile phone and/or receive a program guide selection displayed on a display device associated with a television-based client device 118.

Although the indexing service 102 and the recommendation service 104 are each illustrated and described as single application programs, each of the indexing service 102 and recommendation service 104 can be implemented as several component applications distributed to each perform one or more functions in a media content reviews search system. Further, although the indexing service 102 and the recommendation service 104 are illustrated and described as separate application programs, the indexing service 102 and the recommendation service 104 can be implemented together as a single application program and/or in a single computing-based device to implement embodiments of media content reviews search.

Figure 2:
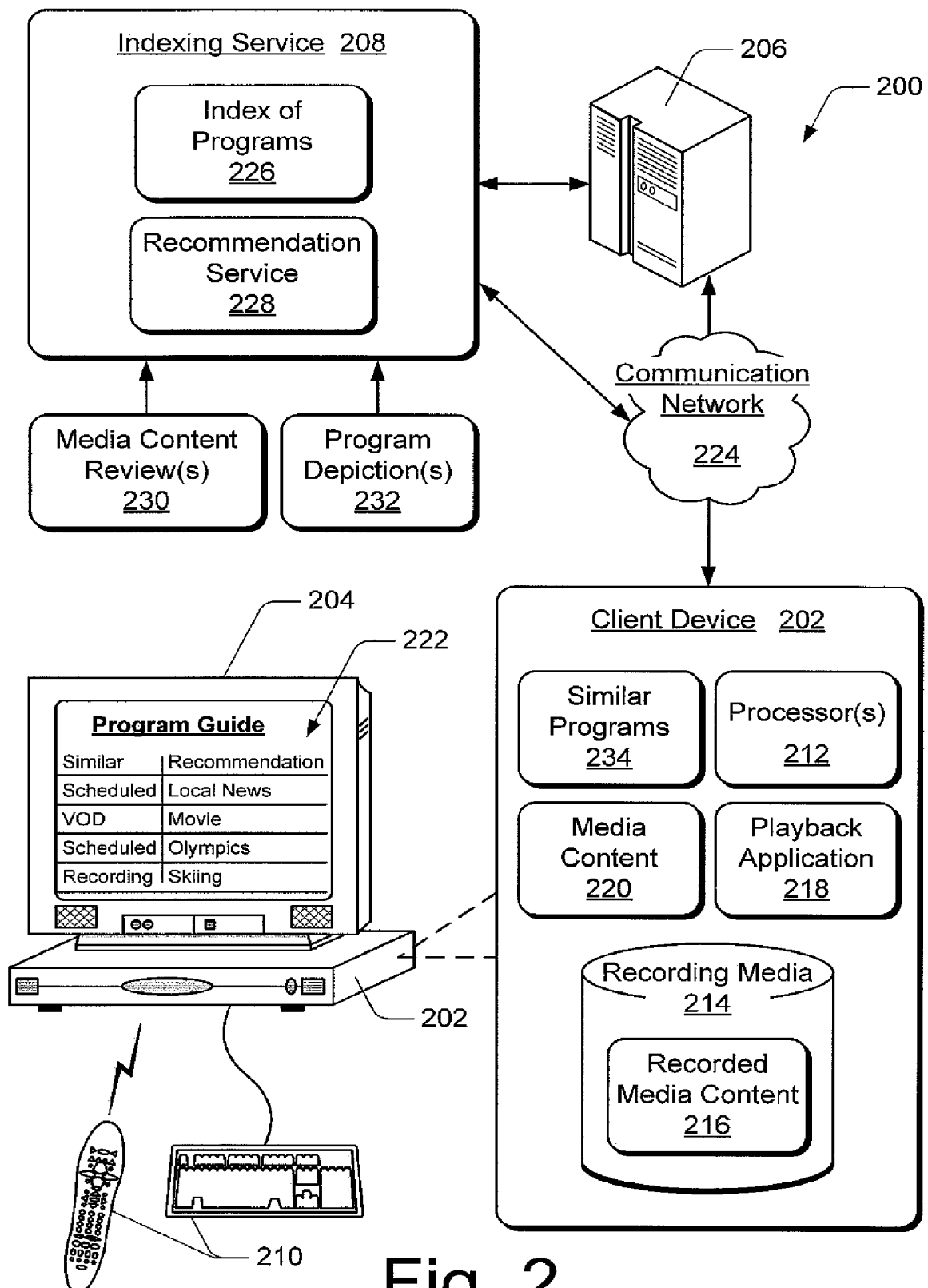
FIG. 2 illustrates an exemplary television-based system in which embodiments of media content reviews search can be implemented.

FIG. 2 illustrates an exemplary television-based system 200 in which embodiments of media content reviews search can be implemented. The system 200 includes a television-based client device 202, a display device 204, content provider(s) 206, an indexing service 208, and input devices 210, such as a remote control device and a computer keyboard. The display device 204 can be any type of television, LCD, or similar television-based display system that renders audio, video, and/or image data. The client device 202 and display device 204 together are but one example of a television-based client system, examples of which are described with reference to the exemplary IP-based television (IPTV) system 500 shown in FIG. 5, and with reference to the exemplary entertainment and information system 700 shown in FIG. 7.

Client device 202 can be implemented in any number of embodiments, such as a set-top box, a digital video recorder (DVR) and playback system, an appliance device, a gaming device, and as any other type of client device that may be implemented in a television-based entertainment and information system. In this example, client device 202 includes one or more processor(s) 212, recording media 214 that maintains recorded media content 216, and a playback application 218 which can be implemented as computer executable instructions and executed by the processor(s) 212 to implement embodiments of media content reviews search. Additionally, client device 202 may be implemented with any number and combination of differing components as further described below with reference to the exemplary client device 600 shown in FIG. 6.

Recording media 214 along with the playback application 218 can be implemented as a DVR system to record and maintain the recorded media content 216 which may be any form of on-demand and/or broadcast media content 220 such as programs, movies, commercials, music, and similar audio, video, and/or image content that client device 202 receives and/or records. Further, client device 202 may access or receive additional recorded media content that is maintained with a remote data store (not shown), such as from a video-on-demand server, or media content that is maintained at a broadcast center or content provider that distributes the media content to subscriber sites and client devices.

The playback application 218 is a video control application that, in this example, can be implemented to control the playback of media content 220, the recorded media content 216, and or other video on-demand media content, music, and any other audio, video, and/or image media content which can be rendered and/or displayed for viewing on display device 204, such as a program guide 222. In this example, the program guide 222 includes a similar programming recommendation for a viewer that utilizes the television-based client device 202.

The television-based client device 202 is configured for communication with the content provider(s) 206 via a communication network 224, which in this example, is an IP-based network. The client device 202 receives programs, associated program content, various forms of media content, program guide data, advertising content, programming recommendations, and other media content from content server(s) of the content provider(s) 206 via the IP-based network 224.

In this example, the indexing service 208 includes an index of programs 226 and a recommendation service 228 to implement embodiments of media content reviews search as described with reference to the exemplary media content reviews search system 100, indexing service 102, and recommendation service 104 shown in FIG. 1. The indexing service 208 can receive media content review(s) 230 as well as any other form of program depiction(s) 232 which the indexing service 208 utilizes to generate the index of programs 226.

The indexing service 208 can receive a search request for similar programs, such as from the television-based client device 202 when initiated by a viewer with the remote control input device 210. In an embodiment, the television-based client device 202 communicates the search request to the indexing service 208, and in an alternate embodiment, the search request is routed from the television-based client device 202 to the indexing service 208 via the content provider 206. The indexing service 208 and/or the recommendation service 228 can determine similar programs from the index of programs 226, and return a list of the similar programs 234 as viewing recommendations back to the television-based client device 202.

Methods for media content reviews search, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
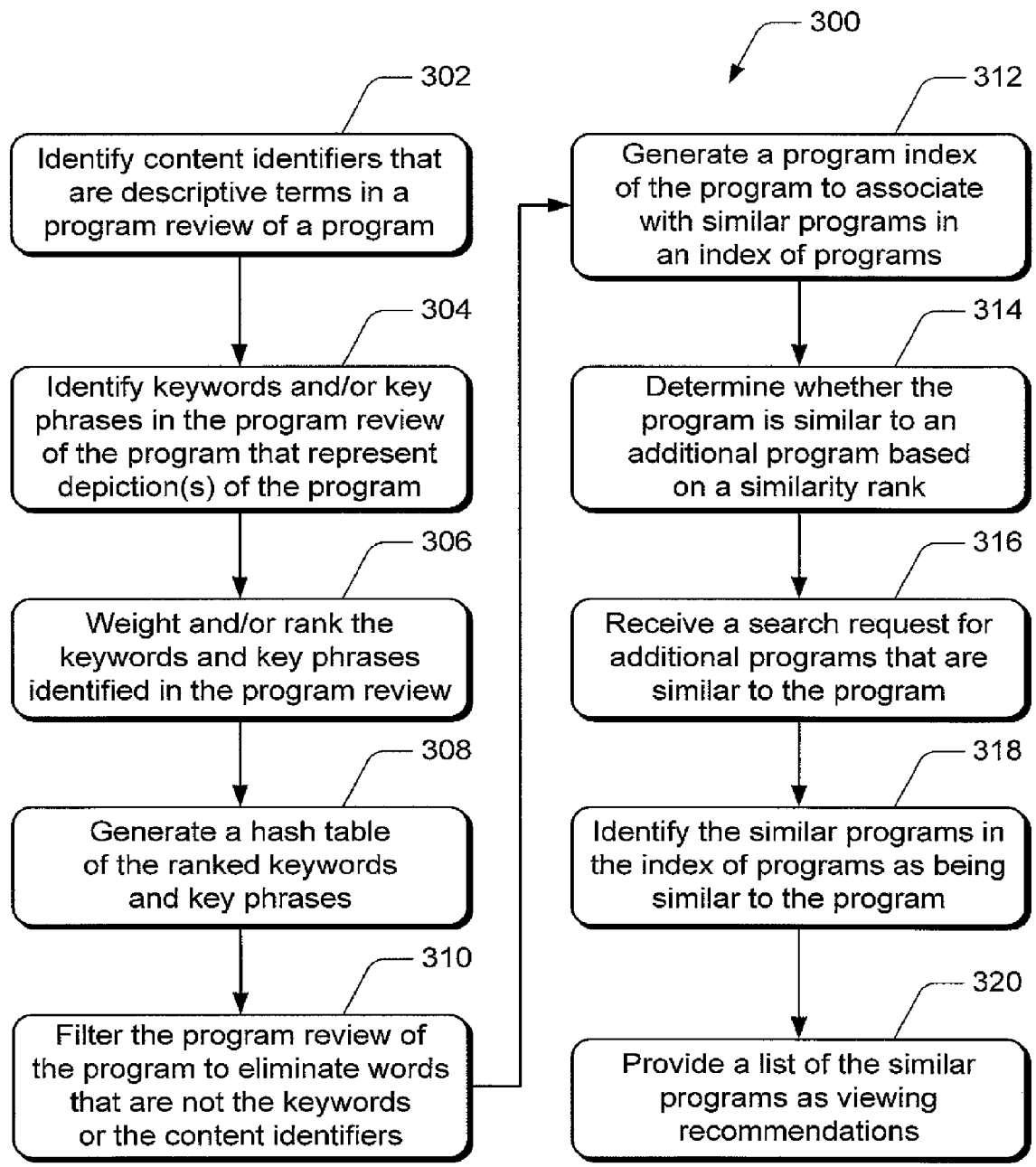
FIG. 3 illustrates exemplary method(s) for media content reviews search.

FIG. 3 illustrates an exemplary method 300 for media content reviews search and is described with reference to the exemplary media content reviews search system 100 shown in FIG. 1, and with reference to the exemplary television-based system 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, content identifiers that are descriptive terms in a program review of a program are identified. For example, indexing service 102 (FIG. 1) receives a program review 106 and generates the list of content identifiers 108. The content identifiers in the program review 106 can be identified based on a list of known content-based identifiers. At block 304, keywords and/or key phrases in the program review of the program are identified that represent depiction(s) of the program where the program review may include one or more depictions of the program. For example, indexing service 102 identifies the keywords in the program review 106 and generates the weighted or ranked keywords 110 at block 306.

At block 308, a hash table of the ranked keywords and key phrases is generated. For example, the indexing service 102 generates the hash table of keywords 112 from the program review 106 to facilitate optimized searching for similar programs. At block 310, the program review of the program is filtered to eliminate words that are not the keywords or the content identifiers in the program review. For example, the indexing service filters the program review 106 such as by object filtering to take out words that don't have a relevance to a depiction of the program.

At block 312, a program index of the program is generated to associate the program with similar programs in an index of programs. For example, the indexing service 102 indexes the program at 122 such that the program is associated with similar programs in the index of programs 114. In an embodiment, the indexing service 102 generates the program index based on the content identifiers 108 and based on the hash table of weighted keywords. The indexing service 102 also generates the index graph 124 in which the distance between a program and an additional program is an indication of whether the program and the additional program are similar.

At block 314, the program can be determined similar to an additional program based on a similarity rank. For example, in one embodiment, the indexing service 102 can establish a similarity rank based on first, a similarity of the ranked keywords and key phrases in conjunction with the content identifiers between the program and the additional program; second, a similarity of the ranked keywords and key phrases between the program and the additional program; and third, a similarity of the content identifiers between the program and the additional program.

At block 316, a search request for additional programs that are similar to the program is received. For example, the indexing service 102 receives a search request 120 for similar programs from recommendation service 104. The search request is initiated by a viewer at the television-based client device 118 and routed to the recommendation service 104 via a media content provider 116. At block 318, the similar programs are identified in the index of programs. For example, the indexing service 102 determines which of the programs in the index of programs 114, or based on the index graph 124, are similar to the program of the search request.

At block 320, a list of the similar programs is provided as viewing recommendations. For example, the indexing service 102 communicates the list of similar programs to the recommendation service 104 which then provides the list of similar programs to a requesting television-based client device 118 as viewing recommendations for a viewer at the client device.

Figure 4:
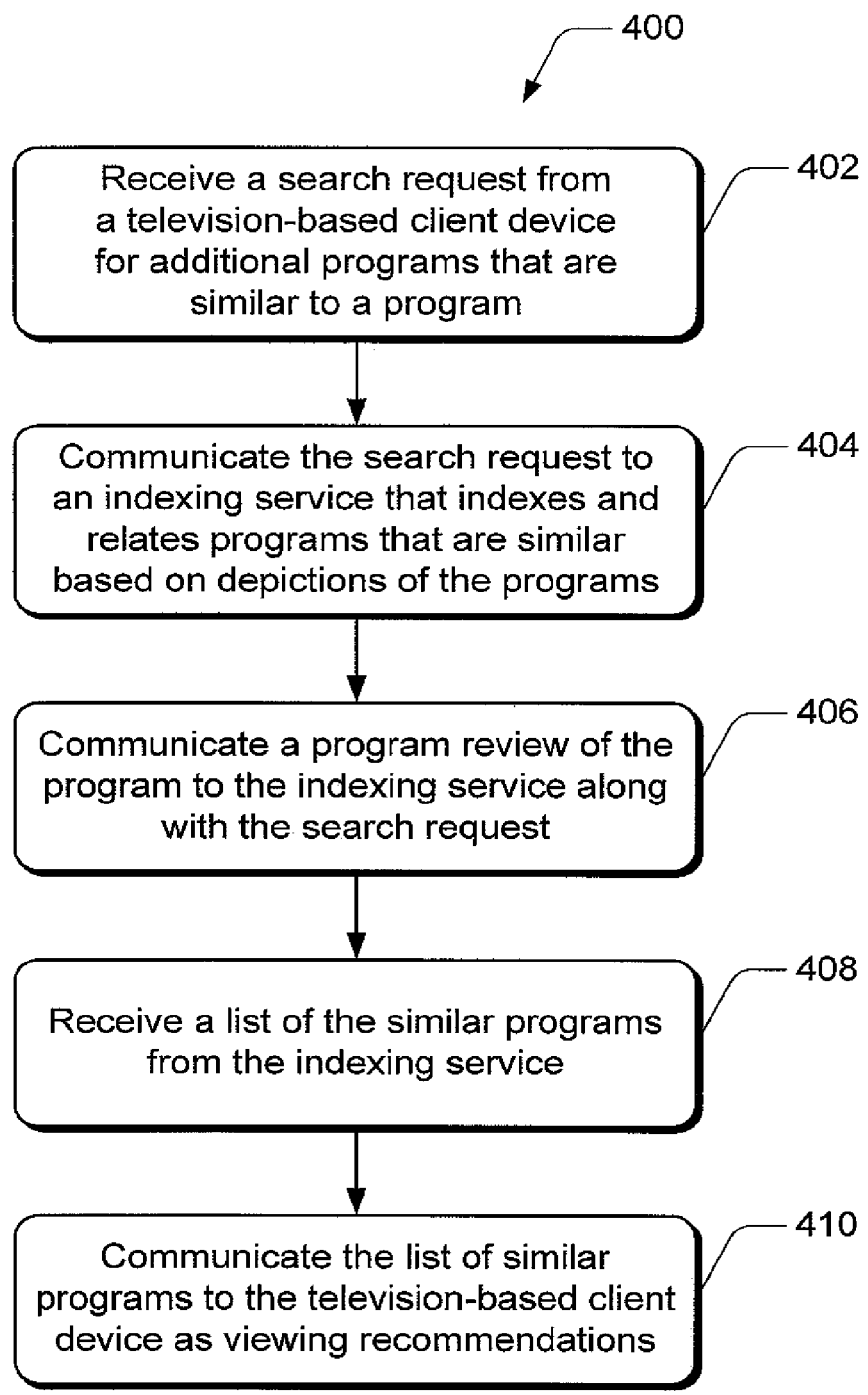
FIG. 4 illustrates exemplary method(s) for media content reviews search.

FIG. 4 illustrates an exemplary method 400 for media content reviews search and is described with reference to the exemplary media content reviews search system 100 shown in FIG. 1, and with reference to the exemplary television-based system 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a search request is received from a television-based client device for additional programs that are similar to a program. For example, content provider 206 (FIG. 2) receives a search request for similar programs from the television-based client device 202 when initiated by a viewer with the remote control input device 210. At block 404, the search request is communicated to an indexing service that indexes and relates programs that are similar based on depictions of the programs. In one embodiment, the content provider 206 communicates the search request to the recommendation service 228 at the indexing service 208. In an alternate embodiment, the indexing service 208 and/or the recommendation service 228 receives the search request from the television-based client device 202.

At block 406, a program review of the program is communicated to the indexing service along with the search request. For example, the content provider 206 optionally communicates a program review of the program to the indexing service along with the search request such that the indexing service can generate a program index for the search program to determine where the search request program would be indexed or positioned in the index of programs 226. Optionally, the indexing service 208 can receive a program review of the search program as a media content review 230. The indexing service 208 identifies content identifiers that are descriptive terms in the program review, and identifies keywords in the program review that represent one or more depictions of the program. The indexing service 208 then generates a program index of the program to determine similar programs in the index of programs 226, where the program index is generated based on the content identifiers and the keywords identified in the program review.

At block 408, a list of the similar programs is received from the indexing service. For example, the indexing service 208 provides a list of similar programs back to the content provider 206 where the list of similar programs includes programs having at least one of an impression, a theme, or a feature that is similar to the program of the search request. At block 410, the list of similar programs is communicated to the television-based client device as viewing recommendations. For example, the content provider 206 provides the list of similar programs to the requesting television-based client device 202 as viewing recommendations for a viewer.

Figure 5:
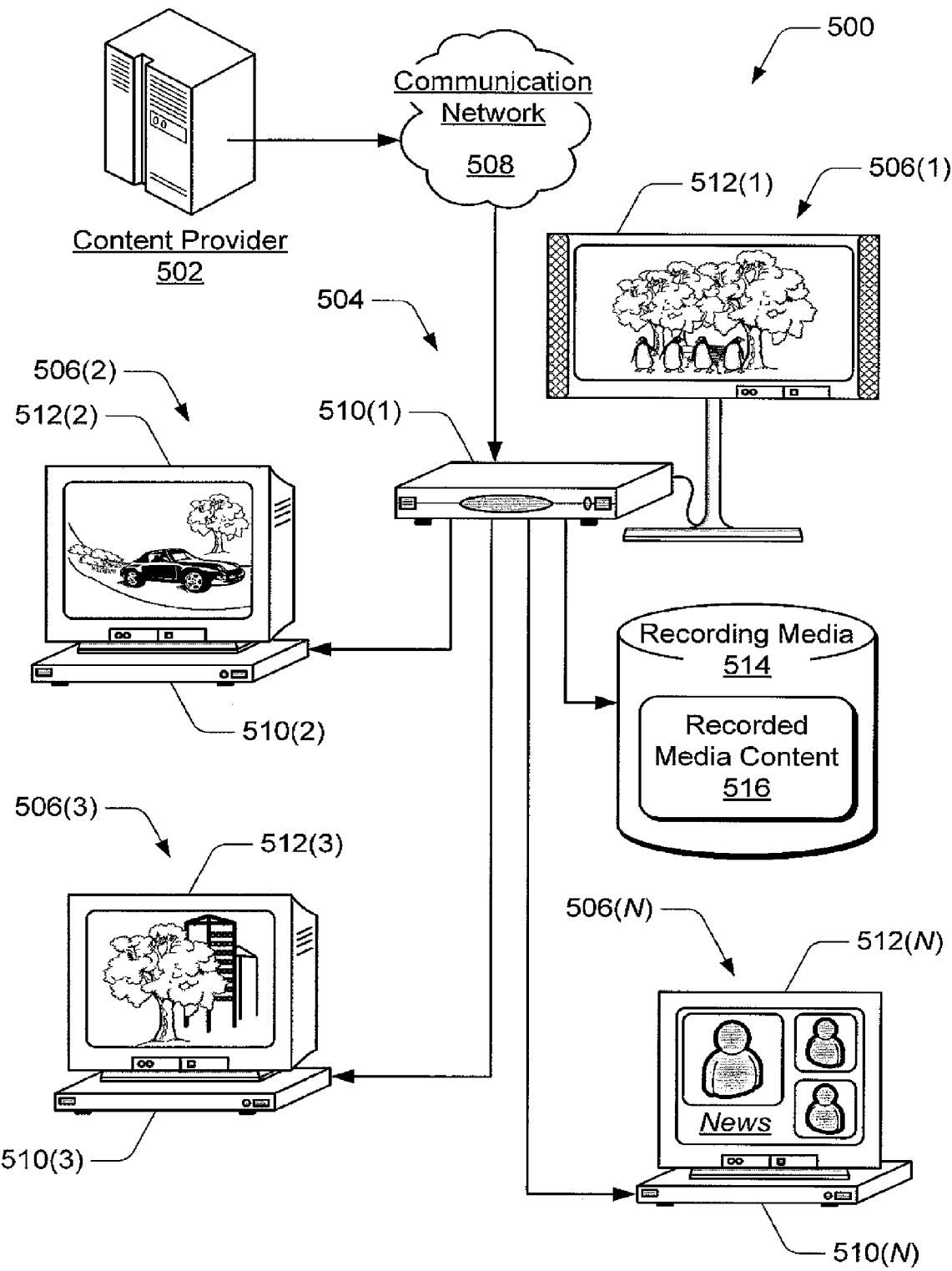
FIG. 5 illustrates an exemplary IP-based television (IPTV) system in which embodiments of media content reviews search can be implemented.

FIG. 5 illustrates an exemplary IP-based television (IPTV) environment 500 in which embodiments of media content reviews search can be implemented. The IPTV environment 500 includes a content provider 502 and a viewing system 504 that can include any number of television-based client systems 506. A client system 506(1) is configured for communication with the content provider 502 via a communication network 508 which, in this example, is an IP-based network. In addition to the client system 506(1), the viewing system 504 includes television-based client systems 506(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 506(1-N) may be implemented with any number and combination of differing components as further described below with reference to the exemplary client device 600 shown in FIG. 6. Further, the IPTV environment 500 may be implemented with any number and combination of differing components as described below with reference to the exemplary entertainment and information system 700 shown in FIG. 7.

The television-based client system 506(1) includes a client device 510(1) and a display device 512(1), such as any type of television, monitor, LCD, or similar television-based display system that renders audio, video, and/or image data. Similarly, the television-based client systems 506(2-N) each include a respective client device 510(2-N) and a respective display device 512(2-N). Each client device 510 can be implemented in any number of embodiments, such as a television-based set-top box, a digital video recorder (DVR) and playback system, an appliance device, a gaming system and as any other type of client device that may be implemented in a television-based entertainment and information system.

Client device 510(1) receives program content from content provider 502 via the communication network 508. In the example viewing system 504, client device 510(1) is a master client device that receives one or more data streams from content provider 502 and then arbitrates stream allocation to distribute the data streams, one each, to one or more of the other satellite client devices 510(2-N). The satellite client devices 510(2-N) connect to the master client device 510(1) to receive a data stream for live television, delayed program viewing, and/or recorded DVR playback. The data streams are allocated by the content provider 502 to the viewing system 504 (e.g., a household), and the data streams can be any combination of high definition and/or standard definition television data streams. For example, the viewing system 504 may receive one high definition data stream and three standard definition data streams depending upon available bandwidth to deliver the data streams.

Although the data streams are not shown specifically, the arrowed communication links illustrate various data communication links which include the data streams. Additionally, the arrowed communication links are not intended to be interpreted as a one-way communication link from client device 510(1) to client device 510(2), for example. It is contemplated that any one or more of the arrowed communication links can facilitate two-way data communication, such as from client device 510(2) to client device 510(1) for example, and from client device 510(1) to content provider 502.

In this system, the master client device 510(1) receives four (4) data streams from the content provider 502 via the communication network 508. A viewing selection from a first data stream is shown for viewing on display device 512(1) at the television-based client system 506(1). A second data stream is directed from the master client device 510(1) to the television-based client system 506(2) and a viewing selection from a second data stream is shown for viewing on display device 512(2). Similarly, a third data stream is directed from the master client device 510(1) to the television-based client system 506(3) and a viewing selection from the third data stream is shown for viewing on display device 512(3). Additionally, a fourth data stream is directed from the master client device 510(1) to the television-based client system 506(4) and a viewing selection from the fourth data stream is shown for viewing on display device 512(4).

The viewing system 504 also includes recording media 514 which can be implemented as a DVR system to record and maintain media content 516, such as any form of programs, movies, and similar audio, video, and/or image content that may be distributed or otherwise received from content provider 502. In one embodiment, the recording media can be implemented as an independent component of the viewing system 504 and connected to the master client device 510(1). Alternatively, the recording media 514 can be implemented as a component of the master client device 510(1) which manages recordings initiated from any of the other satellite client devices 510(2-N). In yet another embodiment, the recording media 514 may be a distributed recording system where any one or more of the client devices 510(1-N) include recording media that is centrally managed by the master client device 510(1).

Figure 6:
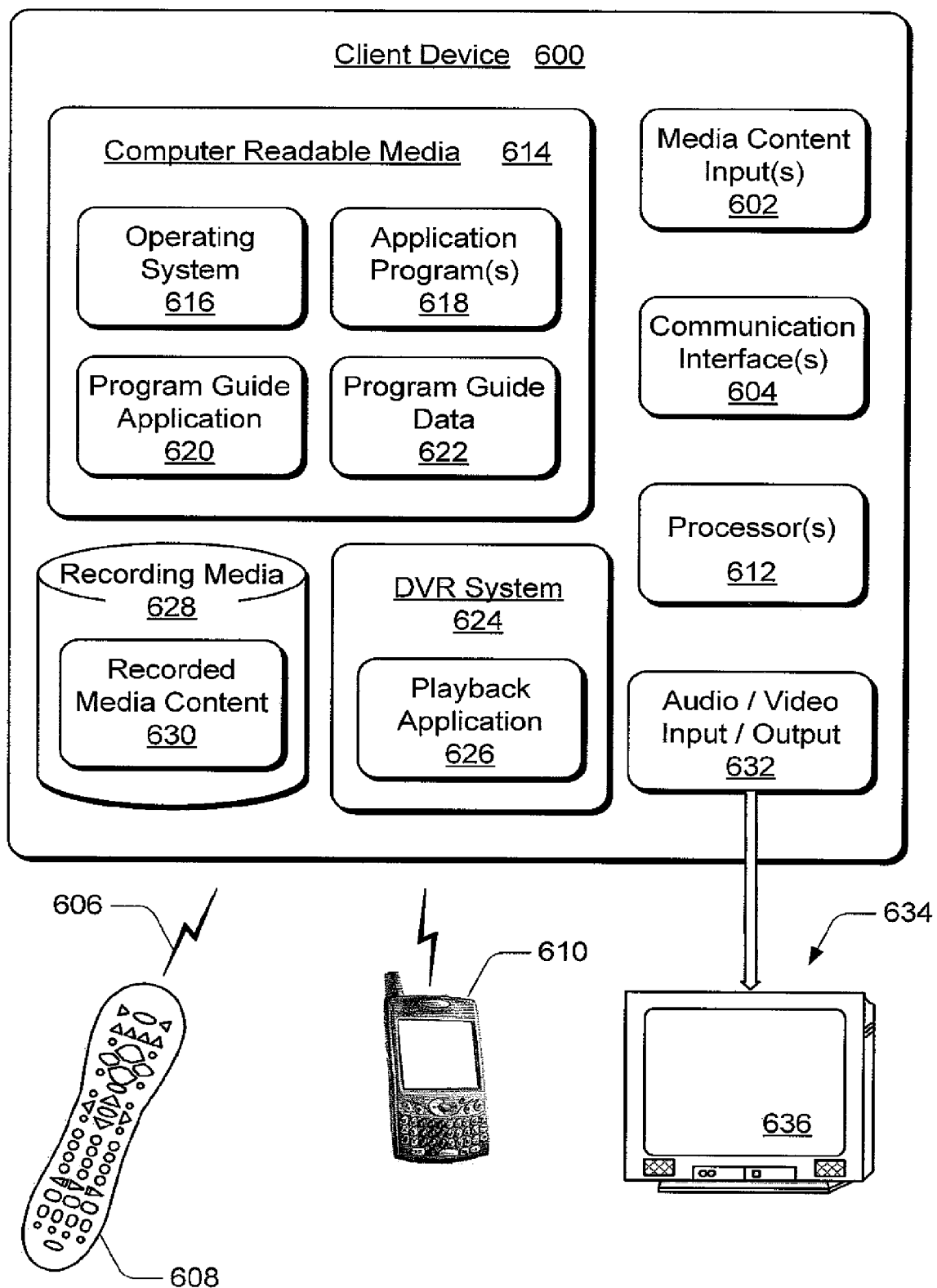
FIG. 6 illustrates various components of an exemplary client device in which embodiments of media content reviews search can be implemented.

FIG. 6 illustrates various components of an exemplary client device 600 which can be implemented as any form of a computing, electronic, and/or television-based client device, and in which embodiments of media content reviews search can be implemented. For example, the client device 600 can be implemented as a television-based client device 110 shown in FIG. 1, as the television-based client device 202 shown in FIG. 2, and/or as any one of the television-based client devices 510(1-N) shown in FIG. 5 as part of the viewing system 504.

Client device 600 includes one or more media content inputs 602 which may include Internet Protocol (IP) inputs over which streams of media content are received via an IP-based network. Device 600 further includes communication interface(s) 604 which can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between the client device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Client device 600 also includes one or more processors 612 (e.g., any of microprocessors, controllers, and the like) which process various computer executable instructions to control the operation of device 600, to communicate with other electronic and computing devices, and to implement embodiments of media content reviews search. Client device 600 can be implemented with computer readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 614 provides data storage mechanisms to store various information and/or data such as software applications and any other types of information and data related to operational aspects of client device 600. For example, an operating system 616 and/or other application programs 618 can be maintained as software applications with the computer readable media 614 and executed on processor(s) 612 to implement embodiments of media content reviews search.

For example, client device 600 can be implemented to include a program guide application 620 that is implemented to process program guide data 622 and generate program guides for display which enable a viewer to navigate through an onscreen display and locate broadcast programs, recorded programs, video on-demand programs and movies, interactive game selections, network-based applications, and other media access information or content of interest to the viewer. The application programs 618 can include an indexing service 102 or 208, and a recommendation service 104 or 228 to implement features and embodiments of media content reviews search as described herein. Alternatively, a programmed application can be implemented as an integrated module or component of the program guide application 620 to implement embodiments of media content reviews search. The client device 600 can also include a DVR system 624 with playback application 626, and recording media 628 to maintain recorded media content 630.

The client device 600 also includes an audio and/or video output 632 that provides audio and video to an audio rendering and/or display system 634, or to other devices that process, display, and/or otherwise render audio, video, and image data. Video signals and audio signals can be communicated from device 600 to a display device 636 via an RF (radio frequency) link, S-video link, composite video link, component video link, analog audio connection, or other similar communication link.

Figure 7:
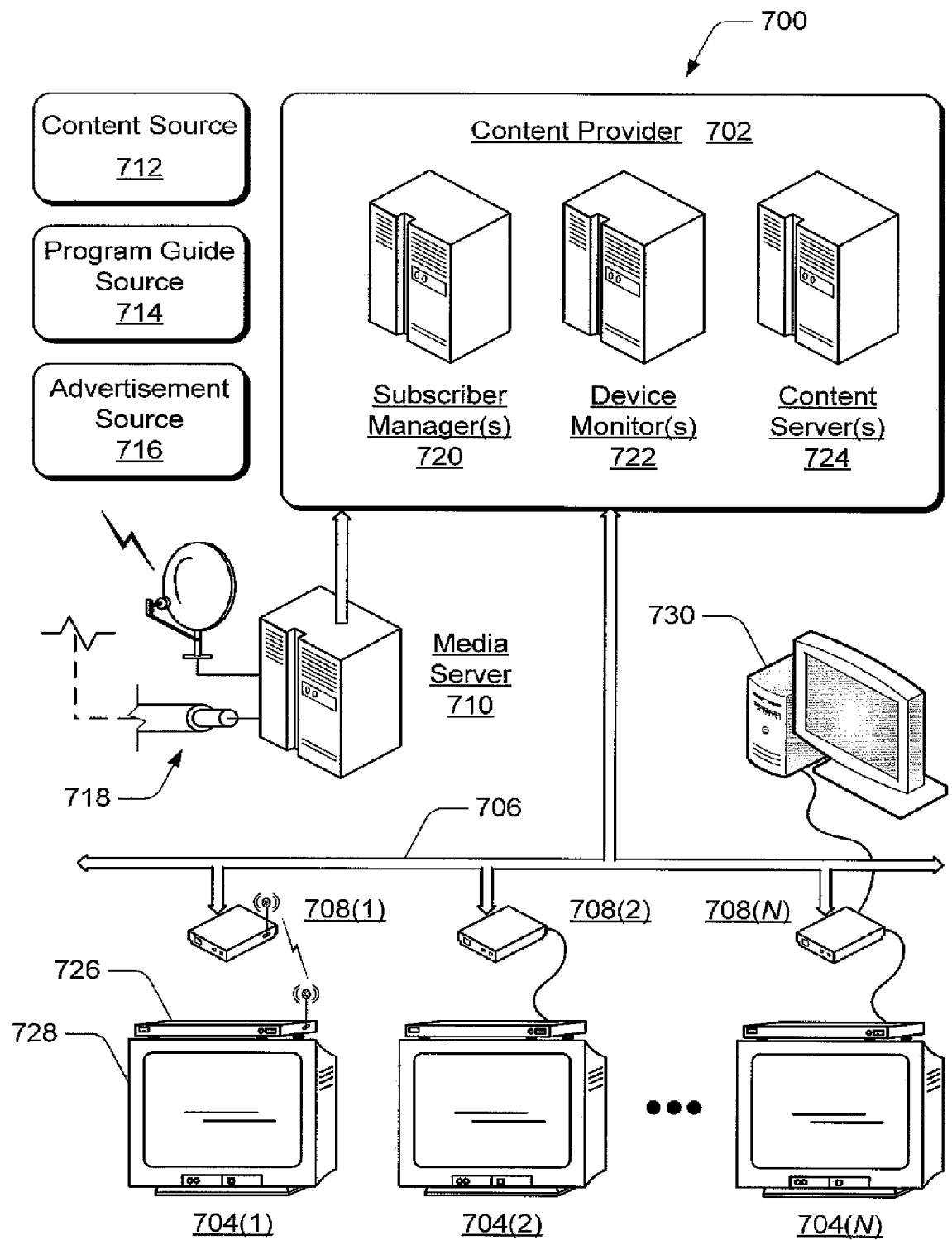
FIG. 7 illustrates various devices and components in an exemplary entertainment and information system in which embodiments of media content reviews search can be implemented.

FIG. 7 illustrates an exemplary entertainment and information system 700 in which an IP-based television environment can be implemented, and in which embodiments of media content reviews search can be implemented. System 700 facilitates the distribution of program content, program guide data, and advertising content to multiple viewers and to multiple viewing systems. System 700 includes a content provider 702 and television-based client systems 704(1-N) each configured for communication via an IP-based network 706. Each television-based client system 704(1-N) is an example of the television-based client system 506(1) described with reference to FIG. 5. Each of the television-based client systems 704(1-N) can receive one or more data streams from content provider 702 and then arbitrate stream allocation to distribute the data streams, one each, to one or more other satellite client devices in a viewing system.

The network 706 can be implemented as a wide area network (e.g., the Internet), an intranet, a Digital Subscriber Line (DSL) network infrastructure, or as a point-to-point coupling infrastructure. Additionally, network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content provider 702 and the client systems 704(1-N). The television-based client systems 704 (1-N) receive program content, program guide data, advertising content, closed captions data, and the like from content server(s) of the content provider 702 via the IP-based network 706.

System 700 includes a media server 710 that receives program content from a content source 712, program guide data from a program guide source 714, and advertising content from an advertisement source 716. In an embodiment, the media server 710 represents an acquisition server that receives the audio and video program content from content source 712, an EPG server that receives the program guide data from program guide source 714, and/or an advertising management server that receives the advertising content from the advertisement source 716.

The content source 712, the program guide source 714, and the advertisement source 716 control distribution of the program content, the program guide data, and the advertising content to the media server 710 and/or to other television-based servers. The program content, program guide data, and advertising content is distributed via various transmission media 718, such as satellite transmission, radio frequency transmission, cable transmission, and/or via any number of other wired or wireless transmission media. In this example, media server 710 is shown as an independent component of system 700 that communicates the program content, program guide data, and advertising content to content provider 702. In an alternate implementation, media server 710 can be implemented as a component of content provider 702.

Content provider 702 is representative of a headend service in a television-based content distribution system, for example, that provides the program content, program guide data, and advertising content to multiple subscribers (e.g., the television-based client systems 704(1-N)). The content provider 702 can be implemented as a satellite operator, a network television operator, a cable operator, and the like to control distribution of program and advertising content, such as movies, television programs, commercials, music, and other audio, video, and/or image content to the client systems 704(1-N).

Content provider 702 includes various components to facilitate media data processing and content distribution, such as a subscriber manager 720, a device monitor 722, and a content server 724. The subscriber manager 720 manages subscriber data, and the device monitor 722 monitors the client systems 704(1-N) (e.g., and the subscribers), and maintains monitored client state information.

Although the various managers, servers, and monitors of content provider 702 (to include the media server 710 in one embodiment) are illustrated and described as distributed, independent components of content provider 702, any one or more of the managers, servers, and monitors can be implemented together as a multi-functional component of content provider 702. Additionally, any one or more of the managers, servers, and monitors described with reference to system 700 can implement features and embodiments of media content reviews search.

The television-based client systems 704(1-N) can be implemented to include a client device 726 and a display device 728 (e.g., a television). A client device 726 of a television-based client system 704 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 704(N) is implemented with a computing device 730 as well as a client device 726. Additionally, any of the client devices 726 of a client system 704 can implement features and embodiments of media content reviews search as described herein.

Although embodiments of media content reviews search have been described in language specific to structural features and/or methods, it is to be understood that the subject of the appended claims is not necessarily limited to the specific features or methods described. Rather, the specific features and methods are disclosed as exemplary implementations of media content reviews search.

The invention claimed is:

1. A search system, comprising:
a television-based client device; and
a database coupled to the client device and searchable by the client device, the database to maintain:
identities of programs of various media content providers and associated reviews, wherein each review includes a subjective depiction of one of the programs, the subjective depiction including descriptive information that exceeds a generic plot description of the program; and
an index of the programs generated by an indexing service; and
the indexing service configured to:
identify keywords in the subjective depiction of a program;
identify content identifiers in the subjective depiction based on a list of known content identifiers;
filter the subjective depiction of the program to retain words that are the keywords and the content identifiers in the subjective depiction by object filtering to remove words that lack a relevance to the subjective depiction of the program;
weight the keywords with a naive Bayesian algorithm;
generate a hash table of the weighted keywords optimized to enable searching for other subjective depictions that share similar keywords;
generate the index of the programs based on a combination of:
the hash table of the weighted keywords;
the content identifiers; and
co-occurrence analysis; and
position each program in the index of the programs such that each program is associated with one or more similar programs, the association between programs based on the keywords, the content identifiers, and the co-occurrence analysis, wherein the indexing service is further configured to generate the program index based on the content identifiers which are descriptive terms in the subjective depiction and based on the keywords in the subjective depiction and wherein the indexing service is further configured to generate the program index as a graph in which the distance between the program and an additional program is an indication of whether the program and the additional program are similar.

2. A search system as recited in claim 1, wherein a subjective depiction of the program is at least one of an impression, a theme, or a feature of the program.

3. A search system as recited in claim 1, wherein the content identifiers are descriptive terms about the program in the subjective depiction.

4. A search system as recited in claim 1, further comprising a recommendation service to:
receive a search request for additional programs that are similar to the program;

communicate with the indexing service to identify the similar programs in the index of programs; and provide a list of the similar programs as viewing recommendations.

5. A search system as recited in claim 4, wherein the recommendation service provides a list of the similar programs as viewing recommendations via an email message or a mobile text message.

6. A method implemented on a computing device by a processor configured to execute instructions that, when executed by the processor, direct the computing device to perform acts comprising:

identifying one or more reviews of a program, wherein each review includes a subjective depiction of the program, each subjective depiction including descriptive information that exceeds a generic plot description of the program;

identifying content identifiers and keywords in the subjective depiction, wherein the content identifiers are based on a list of known content-based identifiers and comprise descriptive terms about the program and the keywords represent the subjective depiction of the program;

filtering the subjective depiction of the program to eliminate words that are not the keywords or the content identifiers in the program subjective depiction;

generating the program index of the program includes weighting the keywords and generating the program index based on the weighted keywords and the content identifiers;

ranking the keywords and content identifiers with a naïve Bayesian algorithm;

generating a hash table of the ranked keywords and the content identifiers, the hash table optimized to enable searching for other subjective depictions that share similar keywords or content identifiers to the identified one or more subjective depictions of the program;

generating an index of the program based on the hash table such that the program is associated with similar programs in the index; and storing the index in a database which is coupled to and searchable by a television-based client device, wherein generating the program index of the program includes generating a graph in which the distance between the program and an additional program is an indication of whether the program and the additional program are similar.

7. A method as recited in claim 5, wherein the subjective depiction of the program is an impression, a theme, or a feature of the program.

8. A method as recited in claim 7, further comprising:

ranking the keywords and the key phrases identified in the subjective depiction;

determining whether the program is similar to an additional program based on a similarity rank that is established based on:

first, a similarity of the ranked keywords and key phrases in conjunction with the content identifiers between the program and the additional program;

second, a similarity of the ranked keywords and key phrases between the program and the additional program; and third, a similarity of the content identifiers between the program and the additional program.

9. A method as recited in claim 5, wherein the content identifiers are identified in the subjective depiction based on a list of known content-based identifiers including a director's name, a writer's name, and actors' names.

10. A method as recited in claim 5, further comprising:

receiving a search request for additional programs that are similar to the program;

identifying the similar programs in the index of programs as being similar to the program; and providing a list of the similar programs as viewing recommendations.

11. A method as recited in claim 5, wherein the subjective depictions describe with subjective relevance how the writers of the subjective depictions think about the program and wherein the writers are movie reviewers, critics, members of usenet groups, or bloggers.

12. A method for identifying media programming and viewing recommendations that are subjectively similar to a program implemented on a computing device by a processor configured to execute instructions, that when executed by the processor direct the computing device to perform acts comprising:

receiving a search request from a television-based client device for additional programs that are similar to the program;

communicating the search request to an indexing service that is in communication with the television-based client device, that is searchable by the television-based client device, and that relates similar programs, wherein a similarity is based on subjective depictions of the programs by critics, opinion reviews, and additional information about the program beyond a plot description;

communicating a program subjective depiction of the program to the indexing service with the search request, the indexing service configured to:

identify content identifiers that are descriptive terms in the subjective depiction;

identify keywords in the subjective depiction of the program;

filter the subjective depiction of the program to retain words that are the keywords and the content identifiers in the subjective depiction by object filtering to remove words that lack a relevance to the subjective depiction of the program;

weight the keywords with a naïve Bayesian algorithm;

generate a hash table of the weighted keywords optimized to enable searching for other reviews that share similar keywords;

generate a program index of the program to determine which of the programs in the index of programs are similar, the program index being generated based on the content identifiers and the keywords in the subjective depiction; and determining whether the program is similar to an additional program based on a similarity rank that is established based on:

a similarity of the ranked keywords and key phrases in conjunction with the content identifiers between the program and the additional program;

a similarity of the ranked keywords and key phrases between the program and the additional program; and a similarity of the content identifiers between the program and the additional program;

determining a degree of the similarity by traversing an index graph, wherein a shorter distance between two programs on the index graph indicates a greater similarity;

receiving a list of the similar programs from the indexing service; and communicating the list of similar programs to the television-based client device as viewing recommendations in a program guide selection displayed on a display device associated with the television-based client device, wherein the viewing recommendations are in a ranked order based on a distance offset in the index graph.

13. A method as recited in claim 12, wherein the list of similar programs includes programs having at least one of an impression, a theme, or a feature that is similar to the program of the search request.

14. A method as recited in claim 12, wherein the television-based client device comprises media content inputs configured to receive Internet Protocol (IP) input via an IP-based network.

* * * * *